3,226,251
Patented Dec. 28, 1965

3,226,251
METHOD OF MANUFACTURING FILTER ELEMENTS
James A. Norton, Flint, and Robert E. Holloway, Durand, Mich., assignors to General Motors Corporation, Detroit, Mich., a corporation of Delaware
No Drawing. Filed May 4, 1961, Ser. No. 107,665
3 Claims. (Cl. 117—155)

This invention relates to paper filter elements and more particularly to resin impregnated filter paper useful in the manufacture of oil filter elements and the like.

It is customary practice to impregnate paper filter elements which are used in the manufacture of oil filters and the like, particularly those consisting of paper bellows, with a thermosetting resin such as a phenol-formaldehyde resin in order to impart suitable structural resistance in the paper toward collapse and tearing. In a conventional process to this end, the filter paper is first impregnated with a liquid phenolic varnish. The impregnated paper is then passed into a drying oven maintained at about 190° F. where most of the solvent which forms a carrier for the phenolic varnish is evaporated to permit efficient handling of the paper. The partially dried filter paper is then folded preferably in the form of a bellows. The folded paper is then cut to suitable lengths and assembled with other parts into oil filter elements. The final operation involves subjecting the completed assembly to oven heat in order to cure the impregnated varnish and the adhesives which are applied to bond the filter element parts together.

It is the object of this invention to provide an improved and more economical process for manufacturing filter paper having superior resistance to collapse and tearing which involves impregnating the paper with a resin composition capable of drying at temperatures markedly below drying temperatures heretofore required, thus reducing the oven heating facilities needed in the step of drying the resin in the paper filter preparatory to subsequent folding and curing operations. This and other objects are accomplished by using as the resin impregnant composition a mixture of water, a resole and a thermoplastic lignin-type resinous material derived from wood and containing both methoxyl and hydroxyl groups in certain proportions. Other objects and advantages of this invention will appear from the following detailed description.

As briefly indicated above, this invention is concerned with the manufacture of paper filter elements for use in oil filter applications and the like which include a paper filtering medium preferably in the form of a cylinder having the walls thereof folded in a bellows-like configuration to achieve maximum filter surface and physical strength. Desirably, the ends of the cylindrical filter element are bonded or fastened to rigid end plates by means of a suitable adhesive type synthetic resin. This invention is concerned principally with the manufacture of the paper portion of the filter element and more particularly with the process of impregnating the paper with a resin which on curing provides the paper with desirable resistance to collapse and tearing.

In the past, the paper element was manufactured in a process which involved first coating the paper with a heat curable liquid phenol-formaldehyde varnish by means of roller apparatus such as is disclosed in the United States Patent No. 2,700,620, Somers, assigned to the assignee of the present invention. The phenol-formaldehyde varnish consists essentially of a heat curable or stage A-type phenol-formaldehyde resin dissolved in a suitable carrier solvent such as aqueous isopropanol or ethanol.

The process of this invention involves the use of a novel impregnant which provides the filter paper with equally satisfactory strength and flexibility characteristics but which may be processed through the drying step at temperatures of about 50° F. less than is necessary with the aforementioned phenol-formaldehyde-type resin. Specifically, it has been discovered that a filter paper impregnating mixture consisting of the combination of water, a resole varnish and a thermoplastic, lignin-type resinous material derived from wood and containing both methoxyl and hydroxyl groups provides unexpected advantageous results.

The lignin-type resin above referred to is known commercially as Vinsol. Briefly, these materials are obtained from a variety of wood products by physical and/or chemical treatment. The Vinsol material is a thermoplastic lignin-type resinous material derived from wood and containing methoxyl and hydroxyl groups. It may also be described as a substantially gasoline insoluble resinous material obtained by extracting a resinous wood with a coal tar hydrocarbon and removing the hydrocarbon by evaporation leaving a residue comprising a mixture of wood rosin and thermoplastic resinous material, then extracting the rosin with a petroleum hydrocarbon leaving a thermoplastic resinous material.

The process which is employed in order to impart desirable structural resistance to collapse and tearing involves first impregnating the paper with a varnish in accordance with the invention. This varnish consists of a mixture of a heat-curable phenol-formaldehyde resin, water and the aforesaid Vinsol. The Vinsol is preferably present in amounts of about 25 parts by weight of the Vinsol to 100 parts of the phenol-formaldehyde resin solids. It has been determined that up to about 28 parts by weight of the Vinsol solids may be used per 100 parts of phenol-formaldehyde solids. Beyond this amount losses have been observed in the physical properties of the cured paper. Thus, for example, at 32 parts by weight of the Vinsol the filter paper tensile strength is reduced to a significant degree and at 36 parts a pronounced inferiority is observed. Moreover, as the quantity of Vinsol is increased beyond 28 parts, the final curing reactions become undesirably slow.

The heat curable phenol-formaldehyde resin referred to may be either in the form of a resole or a novolak. However, a resole is preferred since the novolak produces a considerably more brittle product. The term "resole" as used herein is intended to refer to essentially an uncross-linked resin formation of phenol alcohols formed as first products of an alkali catalyzed reaction of phenols and aldehydes plus some methylene ethers or methylol derivatives. The resole is soluble in such organic solvents as acetone, ethanol and isopropanol. The resole does not require a catalyst for further reaction. In the case of a novolak, the addition of a formaldehyde-supplying material such as hexamethylenetetramine is used in the mixture for promoting further reaction and cross-linking of the novolak.

It is preferred that the paper impregnant contain at least 20 parts by weight of the Vinsol in order to take advantage of the unexpectedly low oven temperatures which may be used to evaporate the solvent from the paper. The amount of Vinsol used per 100 parts of resole solids could be reduced below 20 parts by weight if the water content of the mixture was also increased. However, with a straight resole varnish an increase in the water content is accompanied by an increasing brittleness of the cured paper. Thus, if the low drying oven temperatures are to be maintained, a significant reduction of the Vinsol below 20 parts of the Vinsol per 100 parts of resole solids must be accomplished by an increase in the water content which would produce excessively brittle filter paper.

It is believed that the Vinsol counteracts the normal tendency for the paper to become more brittle due to an increased water content and in order to secure the benefits of low drying temperatures referred to above, the quantity of water should be a substantial fraction of the maximum water which can be tolerated by the mixture without its becoming heterogeneous.

The maximum amount of water which may be present in the impregnant is the maximum quantity which can be added to the mixture of the Vinsol and the resole varnish without the composition becoming heterogeneous. The step of increasing the quantity of Vinsol present causes a decrease in the water tolerance. At the preferred level of 25 parts by weight of the Vinsol per 100 parts by weight of the resole varnish solids, the water tolerance at room temperatures of about 77° F. is about 25 parts by weight of water per 100 parts of the Vinsol-resole solids mixture when this mixture is prepared by mixing a 60% Vinsol solution in isopropanol with the (ethanolic) resole varnish of about 63% to 68% solids composition. When the same resole varnish free of the Vinsol is mixed with water, approximately 50 parts by weight of water can be tolerated at 77° F. before the composition becomes heterogeneous. It is preferred to use about 18.5 parts by weight of water per 100 parts of Vinsol-resole varnish solids or about 75% of the maximum amount which can be tolerated and still maintain homogeneity. An increase in the water content beyond the 18.5 parts tends to present difficulties in localized areas of the filter paper due to a preferential evaporation of alcohol resulting in localized areas of nonuniformity in the properties of the filter paper. In order to maintain the quick drying benefits at a maximum, it is preferred to maintain the water content near to the practical maximum water content of about 18.5 parts of water per 100 parts of the Vinsol-resole varnish solids. A progressive reduction of the water content below the 18.5 parts figure causes a progressive reduction in the extent of quick drying benefits until it ceases to exist. It is therefore preferred to maintain the water content at not significantly outside the range of about 17 to 20 parts by weight to 100 parts of the Vinsol-resole solids.

In the process of making the filter elements the impregnant is applied to the paper by means of machinery including rollers such as are disclosed in the United States Patent No. 2,700,620, Somers, assigned to the assignee of this invention. The rolls of this apparatus have a calendering effect on the paper such that after passing between the rolls, the paper has a somewhat increased resistance to the passage of fluids. It has been found that in the use of the impregnant of this invention including water, the Vinsol and the resole varnish, the amount of this increase due to calendering is about 20% of the increase obtained under like circumstances but using a straight alcoholic resole varnish free of Vinsol and added water. This is believed due to a softening or plasticizing effect of the water on the paper fibers and is an important advantage in the production of improved filter elements.

It is also to be appreciated that the maximum water content of the impregnant is also limited because of the adverse effect of excessive amounts of water on the wet strength character of the paper. Increasing the water content significantly above the 18.5 parts by weight as, for example, in excess of about 20 parts, would tend to cause a substantial reduction in the wet strength of the paper as a consequence of which considerable paper breakage could be expected to occur between the paper impregnation apparatus and the initial drying oven with the production of much scrap and production loss.

A basic requirement of an impregnant resin for use in the manufacture of paper filter elements is that an adequate amount of strength-giving resin solids be capable of completely penetrating the paper sheet with a minimum calendering effect (loss of permeability). The more dilute the impregnant, the greater the volume of impregnant required to obtain a desired resin solids content on the paper sheet as it passes through the impregnant composition. As this volume is increased, the probability of complete penetration of the paper is likewise increased. Increased pressure of the application rolls on the sheet will increase the probability of complete penetration. The more viscous the liquid impregnant, the less is the tendency for it to soak through the sheet and therefore the lower the chances for a complete penetration of the sheet.

Of these factors the amount of pressure which may be applied to the sheet cannot be varied greatly since the pressure on the sheet must be sufficient to enable the rolls to draw the paper off a supply reel. The volume of impregnant which must be supplied to the paper to obtain the appropriate amount of resin solids does not ordinarily vary significantly unless there is a change in the character of the solvent. Thus, at the 63% resin solids level, the viscosity is in the range of 200 to 350 cps. A dilution with ethyl alcohol to about 65–100 cps. drops the resin solids content to 57%–59%. This does not involve a large increase in the impregnant volume to secure the desired resin solids content of the finished sheet. Satisfactory operation may be obtained using either isopropanol or ethanol as a solvent for the resole. Dilution to low resin solids may be used to overcome an inherently high viscosity of a resin solvent. The viscosity need for proper penetration will vary with different solvents. Thus, a 100 cps. viscosity is satisfactory with ethanol as a solvent whereas with isopropanol, a viscosity of 140 cps. is satisfactory.

It may be seen from these considerations that the desirable viscosity of the impregnant and its solids content will depend to some extent on the particular means employed to impregnate the paper. Satisfactory impregnation of the paper may be obtained with the viscosity of the impregnant being between about 20 and 300 centipoises, the optimum viscosity being dependent on the solvents used and the manner of applying the impregnant to the paper.

After the paper has been impregnated, it is passed through an oven preferably maintained at about 140° F. to 150° F. for a time sufficient to evaporate most of the solvent. Subsequently, the paper is folded into bellows and formed into annular structures. Suitable end caps are then applied to the ends of the paper structures by means of a suitable adhesive and the assembly is then subjected to heat in the range of about 300° F. to about 350° F. to cure the impregnant of this invention and the adhesive. Curing temperatures of about 300° F. are adequate and are preferred to avoid the possibility of charring the paper.

Although the invention has been described in terms of a specific embodiment, it is to be understood that variations may be employed and that the invention is not to be limited thereby except as by the following claims.

We claim:

1. In a process for making paper filter elements the steps comprising impregnating the filter paper with a homogeneous liquid composition containing about 100 parts by weight of resole, about 20 to 28 parts by weight of a thermoplastic lignin-type substantially petroleum hydrocarbon-insoluble resinous material derived from wood and containing both methoxyl and hydroxyl groups, and about 17 to 20 parts by weight of water and drying the impregnated filter paper at a relatively low temperature to evaporate most of the volatile constituents.

2. In a process for making paper filter elements the steps comprising impregnating the filter paper with a homogeneous liquid composition containing about 100 parts by weight of resole, about 20 to 28 parts by weight of a thermoplastic lignin-type substantially petroleum hydrocarbon-insoluble resinous material derived from wood and containing both methoxyl and hydroxyl groups, and about 17 to 20 parts by weight of water, drying the impregnated paper at a relatively low temperature to evaporate the volatile constituents without effecting significant cure of the impregnant.

3. In a process for making paper filter elements the steps comprising impregnating the filter paper with a homogeneous liquid composition containing about 100 parts by weight of resole, about 20 to 28 parts by weight of a thermoplastic lignin-type substantially petroleum hydrogen-insoluble resinous material derived from wood and containing both methoxyl and hydroxyl groups, and about 17 to 20 parts by weight of water, drying the impregnated paper at a relatively low temperature to evaporate the volatile constituents without significantly curing the impregnant, and subsequently heating the dried paper to a temperature of about 300° F. to 350° F. whereby said thermoplastic resin and said resole react to form a thermosetting resin providing said paper with high resistance to tearing and collapse.

References Cited by the Examiner
UNITED STATES PATENTS

| | | | |
|---|---|---|---|
| 2,141,043 | 12/1938 | Maters | 260—17.2 |
| 2,357,090 | 8/1944 | D'Alelio | 260—17.5 |
| 2,357,091 | 8/1944 | D'Alelio | 260—25 |
| 2,591,466 | 4/1952 | Reynolds et al. | 117—155 X |
| 2,601,598 | 6/1952 | Daniel et al. | 210—508 X |
| 2,758,101 | 8/1956 | Shappell | 260—25 X |

WILLIAM D. MARTIN, *Primary Examiner.*

RICHARD D. NEVIUS, *Examiner.*